(12) United States Patent
Martin

(10) Patent No.: US 11,959,741 B2
(45) Date of Patent: Apr. 16, 2024

(54) VALLEY MASTER 2020 DEVICE FOR CUTTING A METAL ROOFING PANEL

(71) Applicant: Joseph Edward Martin, Kodak, TN (US)

(72) Inventor: Joseph Edward Martin, Kodak, TN (US)

(*) Notice: Subject to any disclaimer, the term of this patent is extended or adjusted under 35 U.S.C. 154(b) by 324 days.

(21) Appl. No.: 17/091,151

(22) Filed: Nov. 6, 2020

(65) Prior Publication Data

US 2021/0131779 A1 May 6, 2021

Related U.S. Application Data

(60) Provisional application No. 62/931,443, filed on Nov. 6, 2019.

(51) Int. Cl.
| | |
|---|---|
| *G01B 3/04* | (2006.01) |
| *E04D 15/00* | (2006.01) |
| *G01B 3/56* | (2006.01) |
| *G01D 13/22* | (2006.01) |

(52) U.S. Cl.
CPC ............. *G01B 3/04* (2013.01); *E04D 15/00* (2013.01); *G01B 3/56* (2013.01); *G01D 13/22* (2013.01)

(58) Field of Classification Search
CPC .... G01B 3/04; G01B 3/56; G01B 3/02; E04D 15/00; E04D 15/04; G01D 13/22
See application file for complete search history.

(56) References Cited

U.S. PATENT DOCUMENTS

| | | | | |
|---|---|---|---|---|
| 288,613 A | * | 11/1883 | Bolles ...................... | G01B 3/56 33/456 |
| 1,007,539 A | * | 10/1911 | Criss .................... | E04G 21/1891 33/417 |
| 1,027,766 A | * | 5/1912 | Robertson et al. ...... | G01B 3/56 33/459 |
| 1,029,774 A | * | 6/1912 | Taintor ..................... | G01B 3/56 33/456 |
| 1,477,002 A | * | 12/1923 | Parkhill ................... | G01B 3/56 33/476 |
| 2,206,760 A | * | 7/1940 | Ballard .................... | G06G 1/14 33/456 |
| 2,875,523 A | * | 3/1959 | Fay ..................... | E04G 21/1891 33/416 |

(Continued)

FOREIGN PATENT DOCUMENTS

GB          2511492 A  *  9/2014  ......... E04G 21/1891

*Primary Examiner* — John Fitzgerald
*Assistant Examiner* — Tania Courson
(74) *Attorney, Agent, or Firm* — Sherif Guindi

(57) ABSTRACT

This is a measuring tool for use in the installation of metal roofing when such metal roofing must be cut in order to fit along valleys in the roof structure. Valleys are places where the roof surface changes direction, such as where the roof of a gable joins the main body of the roof. The tool measures the point at which the metal roofing panel is to be cut by sliding the base of the tool down the last rib of the last installed panel until the tip of the pointer arm touches the chalk like along which the next panel must fit. The distance from the top of said last panel to the bottom of the base of the tool corresponds to the distance from the top of the new panel to the point at which its leading edge should be cut to fit along the chalk line.

9 Claims, 7 Drawing Sheets

(56) References Cited

U.S. PATENT DOCUMENTS

| | | | | |
|---|---|---|---|---|
| 3,153,859 | A * | 10/1964 | Jones | E04G 21/1891 33/419 |
| 3,174,226 | A * | 3/1965 | Geiger | G01B 5/242 33/388 |
| 4,608,902 | A * | 9/1986 | Ivey | B23Q 9/005 144/136.9 |
| 4,916,822 | A * | 4/1990 | Johnson | G01B 3/56 33/495 |
| D355,133 | S * | 2/1995 | Vachon | D10/64 |
| 5,771,767 | A * | 6/1998 | Itami | B25H 7/00 83/522.18 |
| 5,918,439 | A * | 7/1999 | Metzer | E04D 15/025 52/DIG. 1 |
| 6,098,302 | A * | 8/2000 | Gilliam | E04G 21/1891 33/562 |
| D473,123 | S * | 4/2003 | Anderson | D8/354 |
| 6,886,268 | B1 * | 5/2005 | Morse | E04F 21/1855 52/DIG. 1 |
| 7,165,333 | B1 * | 1/2007 | Abdulkader | B43L 7/10 33/417 |
| 7,228,636 | B1 * | 6/2007 | Moore | G01B 3/566 33/417 |
| 7,437,828 | B1 * | 10/2008 | Rozmiarek | B26B 29/06 33/562 |
| 7,546,687 | B2 * | 6/2009 | Haala | B43L 7/027 33/529 |
| 7,762,003 | B2 * | 7/2010 | Waltman, Jr. | B25H 1/0078 33/465 |
| 8,074,368 | B2 * | 12/2011 | Atwood | B25H 7/00 33/465 |
| 8,407,947 | B2 * | 4/2013 | Yaggi, Jr. | E04D 12/006 33/417 |
| 11,273,550 | B2 * | 3/2022 | Freitag | B25H 7/045 |
| 2003/0088992 | A1 * | 5/2003 | Nelson | E04D 15/04 33/640 |
| 2004/0200087 | A1 * | 10/2004 | Killen | E04D 15/04 33/613 |
| 2011/0107610 | A1 * | 5/2011 | Farr | E04F 21/0076 33/421 |
| 2012/0180330 | A1 * | 7/2012 | Noble | G01C 9/00 33/343 |
| 2013/0025142 | A1 * | 1/2013 | Holt | B43L 7/14 33/456 |
| 2013/0160313 | A1 * | 6/2013 | Swanson | G01B 3/04 33/430 |

* cited by examiner

VALLEY MASTER 2020 DEVICE FOR CUTTING A METAL ROOFING PANEL

CROSS REFERENCE TO RELATED APPLICATIONS

This Nonprovisional Utility Patent Application claims the benefit of Provision Patent Application Number 62931443, filed on Nov. 6, 2019, on behalf of the same inventor of this current Nonprovisional Patent Application, Joseph Edward Martin.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

The inventor installs metal roofing. When installing a metal roof on any structure which has valleys (places where the roof surface changes direction, such as where the roof of a gable joins the main body of the roof), this device is designed to measure the angle at which the metal roofing panel is to be cut more easily and accurately than any tool or method used before it. The inventor has manufactured the device and has used it in the field to install metal roofing. Its benefits are real, and the inventor knows of no other tool that works the way his tool works.

BRIEF SUMMARY OF THE INVENTION

The present invention is a device designed to measure the angle at which a metal roofing panel is to be cut so that it fits properly against a valley (a place where the roof surface changes direction, such as where the roof of a gable joins the main body of the roof). The device is made out of a sturdy unbending material (in the case of the manufactured device—aluminum—but it can be made of a number of other sturdy materials, including, but not limited to, steel or other metals, wood, ceramic, or plastic). The device comprises a base, a pointer arm, and a support arm. The base comprises a straight shaft with angles that allow it to fit snugly on the last rib at the leading edge of the last installed panel. As metal roofing usually comes in panels that are three (3) feet wide from the center of the first rib of the panel to the center of the last rib of the panel, the pointer arm is three (3) feet long, though it can be any length that corresponds with the width of a roofing panel (measured from the center of the first rib of the panel to the center of the last rib of the panel). The base and pointer arm are connected at a right angle. The support arm spans from the top of the base (the distal end that is not connected to the pointer arm) to the distal end of the pointer arm (the end that is not connected to the base). The support arm, and any other element connected to said support arm, are for the purpose of stability and holding the base and pointer arm at a right angle.

When installing a metal roofing panel that must be cut in order to fit properly against a valley, two distances are important: the first distance from the top of the trailing edge of said panel (the edge that overlaps the leading edge of the last installed panel) to the bottom of the trailing edge of said panel to be installed (said first distance will be the same as the distance from the top of the leading edge of the last installed panel to the bottom of the leading edge of the last installed panel); and the second distance from the top of the leading edge (the edge opposite to and parallel to the trailing edge) of said panel to be installed to where said leading edge of said panel must be cut in order to meet the valley. When these two distances are known, one can draw a line on the panel to be installed from the point along the trailing edge of said panel corresponding to first distance to the point along the leading edge of said panel corresponding to the second distance. The operator then cuts said panel along this line. Said panel can then be installed and will fit properly along both the leading edge of the last panel installed (in practice by fitting the first rib of the panel to be installed over the last rib of the last installed panel) and the valley.

This device is useful, because, when the base is placed snuggly on the last rib of the last installed panel (the rib closest to the leading edge of said last installed panel) and with the pointer arm at the bottom, the base can be slid down said last rib of said last installed panel until the point at the distal end of the pointer arm touches the valley (or in practice, the chalk line that is about 2.5 inches from the vertex of the valley). The operator can then easily measure the distance from the top of the last installed panel to the bottom of the base of the device. This distance is the important second distance as described above—the distance from the top of the panel to be installed to where it will touch the valley (or in practice, the chalk line that is about 2.5 inches from the vertex of the valley).

DETAILED DESCRIPTION OF THE INVENTION

Figure 1:
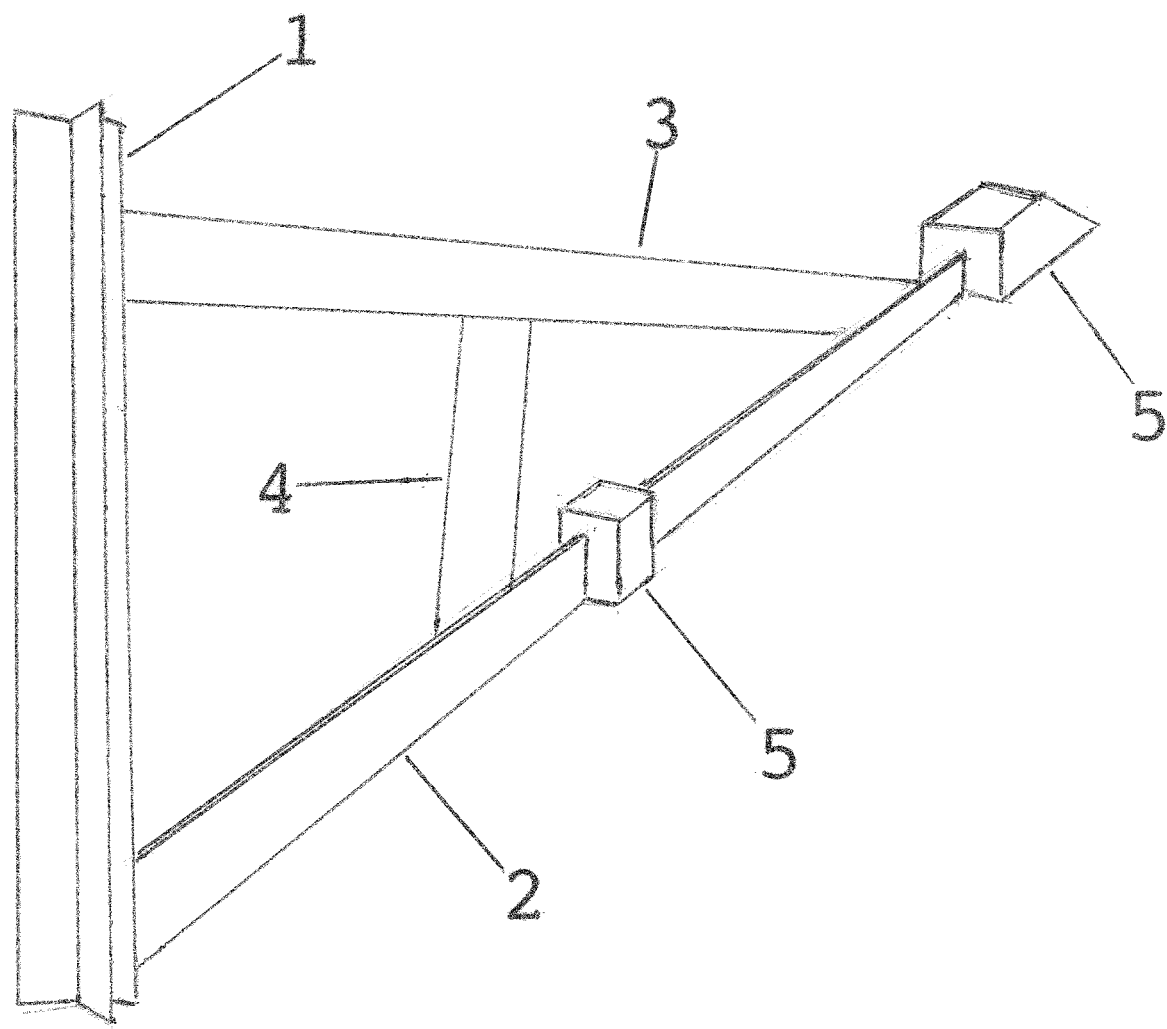
FIG. 1 is a view of the device at an angle as viewed with the base 1 closest to the viewer. The pointer arm 2 is connected to the bottom of the base 1 at a right angle, and the support arm 3 connects the distal ends of the base 1 and the pointer arm 2. There is also a small strut 4 that connects the support arm 3 to the pointer arm 2. Along the pointer arm 2 there may be a number of spacers 5. As illustrated, there are two spacers 5—one on the distal end of said pointer arm 2 and one along said pointer arm 2. These serve to lift the pointer arm 2, so that when the base 1 is placed on the last rib at the leading edge of the last installed panel the pointer arm 2 remains parallel to the roof. Thus, said spacers 5 lift the pointer arm 2 so that said pointer arm 2 remains equidistant from the roof along the length from its proximal end to its distal end.
Figure 2:
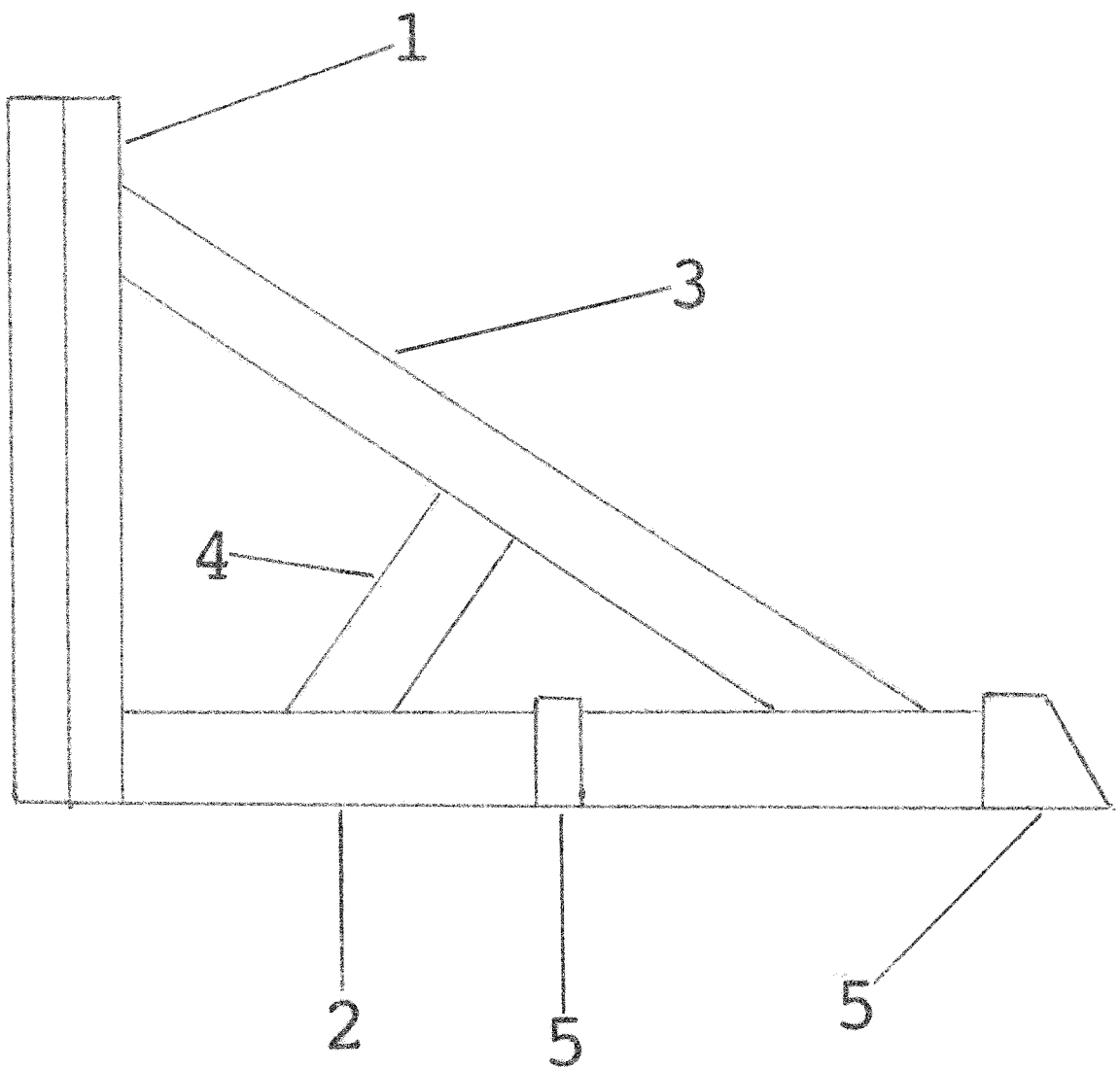
FIG. 2 shows the device from the side. The base 1 is on the left, the pointer arm 2 is at the bottom, and the support arm 3 connects the distal ends of the base 1 and the pointer arm 2. The strut 4 connects the support arm 3 to the pointer arm 2. There are two spacers 5—one on the distal end of said pointer arm 2 and one along said pointer arm 2.
Figure 3:
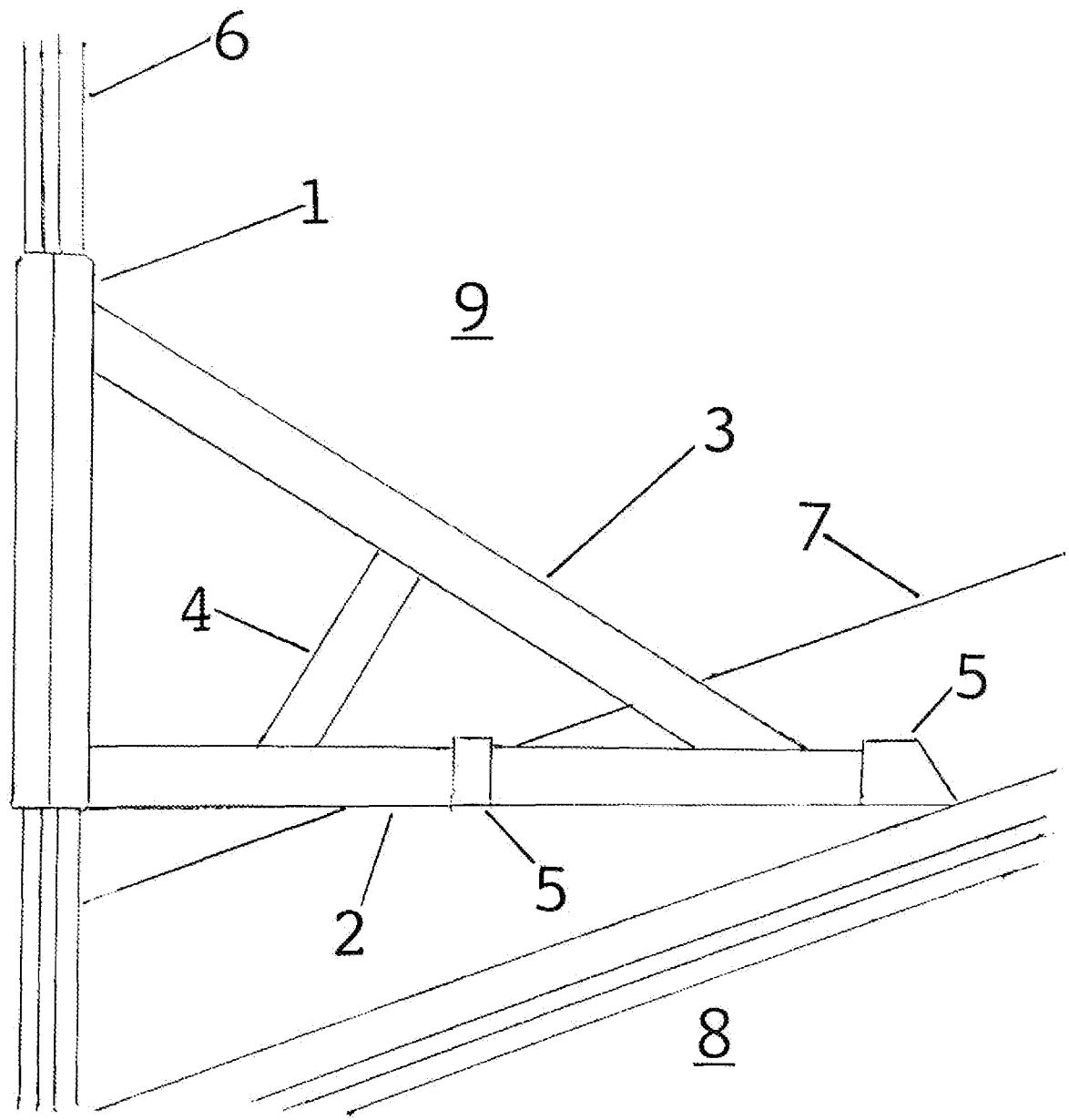
FIG. 3 shows the device with its base 1 fit snuggly on the last rib at the leading edge of the last installed metal roofing panel 6 and slid down said rib so that the distal end of the pointer arm 2 is touching the chalk line 7 (the chalk line that is usually about 2.5 inches from the vertex of the valley 8 formed by a gable or similar structure of the roof 9 [structure]).
Figure 4:
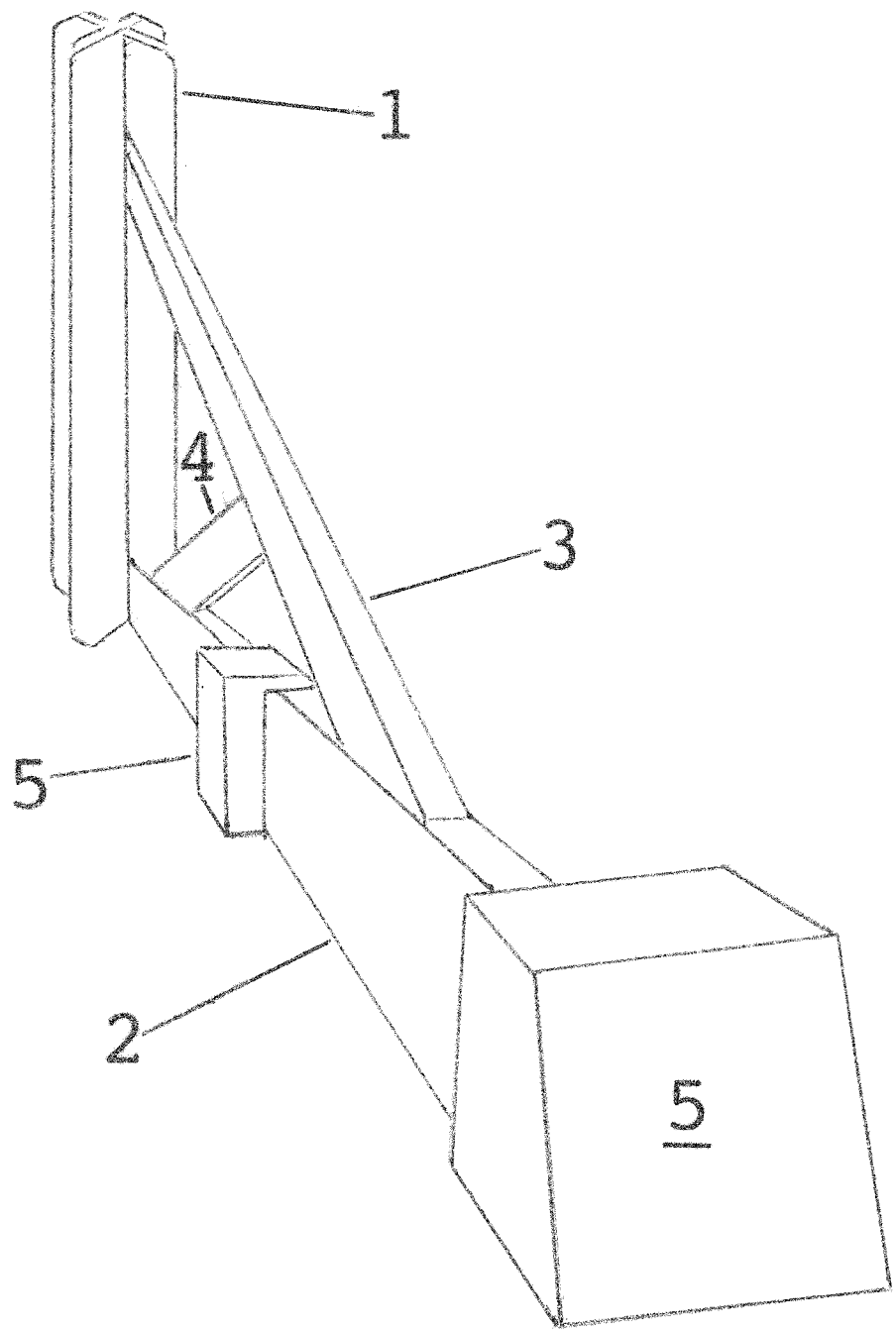
FIG. 4 is a view of the device at an angle as viewed from the tip of the pointer arm 2. This drawing clearly shows the spacers 5 along the pointer arm 2. It also shows how the base 1 is shaped, with its angles (in this case right angles), and how the pointer arm 2 comes to a point.
Figure 5:
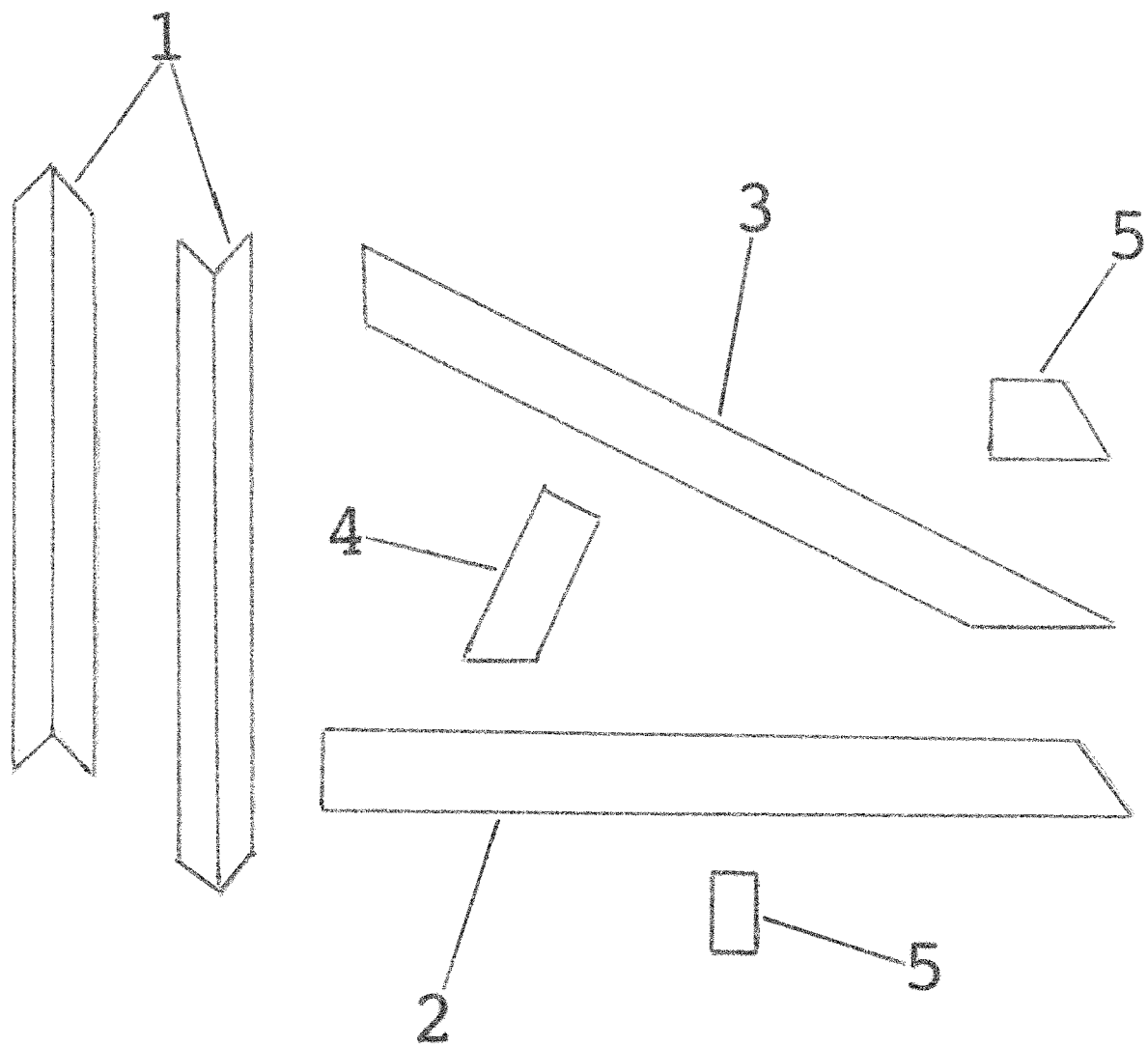
FIG. 5 is an exploded view of the device, showing all of the parts used to construct it.
Figure 6:
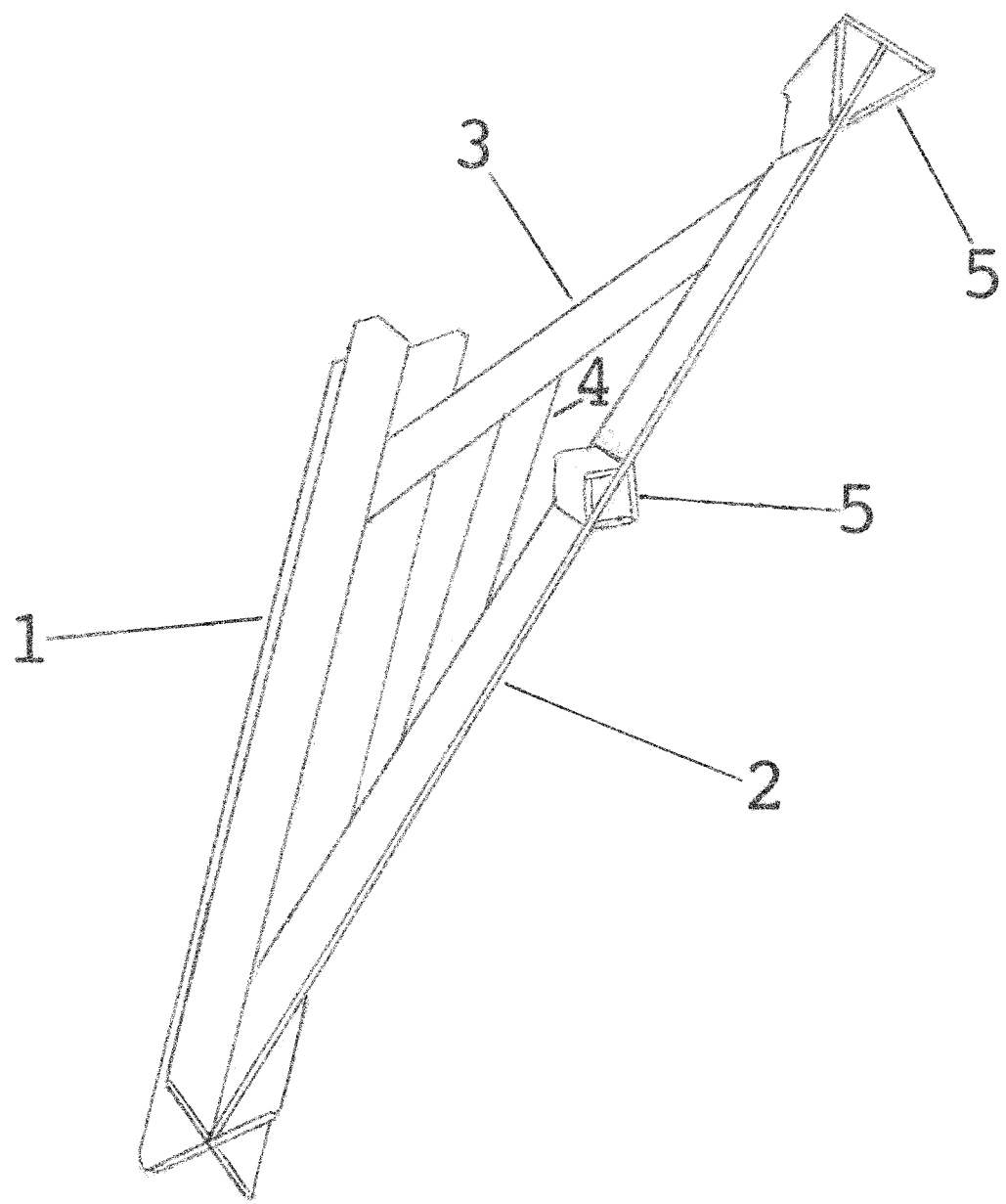
FIG. 6 is a view of another embodiment of the device as viewed at an angle from underneath the pointer arm 2. In this embodiment, the spacers 5 are constructed of the same type of metal stock as the pointer arm 2 and support arm 3, rather than constructing them out of solid metal.
Figure 7:
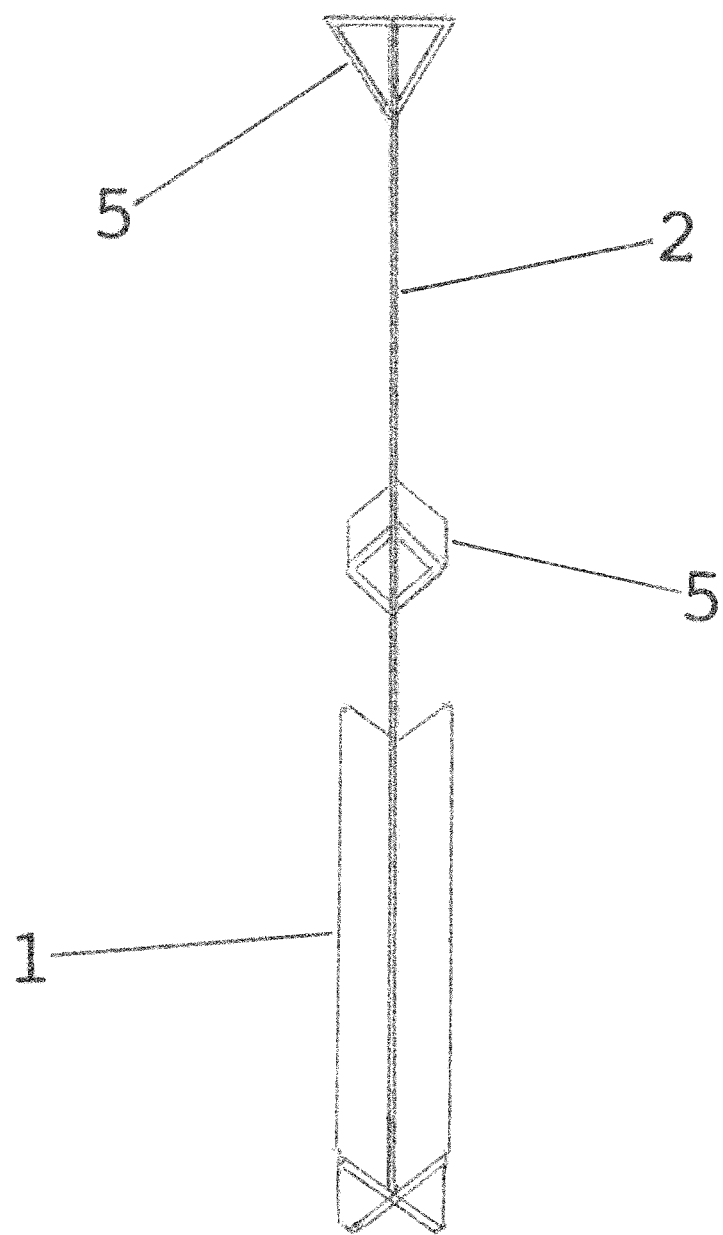
FIG. 7 is another view of the embodiment of the device illustrated in FIG. 6 as viewed from directly underneath the pointer arm 2, thus clearly showing that the spacers 5 are constructed of the same type of metal stock as the pointer arm 2 and are hollow.

Those of ordinary skill in the art will understand that the various descriptions of the preferred embodiments of this invention along with the features of the referenced illustrations may be combined in various ways that are not explicitly described or illustrated herein. Those of ordinary skill in the art may combine or modify the features disclosed herein in ways that are consistent with the teachings of the present disclosure. Certain modifications may be made for practical or aesthetic reasons, including, but not limited to, ease of manufacture, cost savings, or new manufacturing methods that achieve the same end, while remaining consistent with the teachings of the present disclosure. The present disclosure is not intended to limit the scope of the invention by excluding obvious or necessary modifications or combinations of the disclosed features.

The present invention is a device designed to measure the angle at which a metal roofing panel is to be cut so that it fits properly along a valley in the roof. A valley is a place where the roof surface changes direction, such as where the roof of a gable joins the main body of the roof. The device is made out of a sturdy unbending material (in the case of the manufactured device—aluminum—but it can be made of a number of other sturdy materials, including, but not limited to, steel or other metals, wood, ceramic, or plastic). The device comprises a base 1, a pointer arm 2, and a support arm 3. The base 1 comprises a straight shaft with angles in its cross section that allow it to fit snugly on the last rib at the leading edge of the last installed panel. As metal roofing usually comes in panels that are three (3) feet wide from the center of the first rib of the panel to the center of the last rib of the panel, the pointer arm 2 is three (3) feet long, though it can be any length that corresponds with the width of a roofing panel (typically measured from the center of the first rib to the center of the last rib). The base 1 and pointer arm 2 are connected at a right angle. The support arm 3 spans from approximately the top of the base 1 (the distal end that is not connected to the pointer arm 2) to approximately the distal end of the pointer arm 2 (the end that is not connected to the base 1). The support arm 3, and any other element connected to said support arm 3, are for the purpose of stability and holding the base 1 and pointer arm 2 at a right angle.

Standard metal roofing is made of steel and comes in panels that are approximately 38 inches wide. Said panels come in a variety of lengths. Along said width are typically five (5) ribs (which are each approximately 1.5 inches wide and ⅞ inch high) and four (4) flat areas (each of an equal width of approximately 7.5 inches) between said ribs. Said ribs gradually become narrower as they protrude from the flat areas of the panel, starting at about 1.5 inches wide at the flat area and becoming about ⅜ inch wide as they extend away from the flat area. The distance from the center of the first rib to the center of the last rib along the width of said panel is approximately 36 inches.

When installing a metal roofing panel that must be cut in order to fit properly against a valley, two distances are important: the first distance from the top of the trailing edge of said panel (the edge that overlaps the leading edge of the last installed panel) to the bottom of the trailing edge of said panel to be installed (said first distance will be the same as the distance from the top of the leading edge of the last installed panel to the bottom of the leading edge of the last installed panel); and the second distance from the top of the leading edge (the edge opposite to and parallel to the trailing edge) of said panel to be installed to where said leading edge of said panel must be cut in order to meet the valley (or more accurately, to where it meets the chalk line, which is roughly 2.5 inches from the vertex of the valley). Note that these are the two important distances when both the trailing edge and the leading edge of the panel to be installed must be cut in order for the panel to fit along the valley. When these two distances are known, one can draw a line (usually a chalk line created by pulling a chalked string taught between two points and snapping it (pulling on it and releasing it so it deposits a line of chalk)) on the panel to be installed from the point along the trailing edge of said panel corresponding to first distance to the point along the leading edge of said panel corresponding to the second distance. The operator then cuts said panel along this line. Said panel can then be installed and will fit properly along both the leading edge of the last panel installed (in practice, by placing the first rib of the panel to be installed over the last rib of the last panel installed) and the valley (in practice, the chalk line that is about 2.5 inches from the vertex of the valley).

This device is useful, because, when the base 1 is placed on the last rib at the leading edge of the last installed panel with the pointer arm 2 at the bottom, the base 1 can be slid down said last rib until the point at the distal end of the pointer arm 2 (if said pointer arm 2 is the same length as the width of the panel to be installed from the center of its first rib to the center of its last rib) touches the valley (or in practice, the chalk line that is usually about 2.5 inches from the vertex of the valley). The operator can then easily measure the distance from the top of the last installed panel (with any manner of tape measure or ruler) to the bottom of the base 1 of the present device. This distance is the important second distance as described above—the distance from the top of the panel to be installed to where it will touch the valley (or the chalk line that is about 2.5 inches from the vertex of the valley).

In the event that the panel to be installed will only need to have the leading edge cut and not the trailing edge, for example, when said panel will be the first one to reach the valley thus there remains a portion of said panel at the trailing edge with no cuts (with the possible exception of a right angle cut used to reduce the length, rather than the width, of the panel), the method of measurement will vary slightly. The device will still be used to measure the point at which the leading edge of said panel must be cut to accommodate the valley (the second distance). However, there will be an alternate first distance. The alternate first distance will now be along the bottom edge of said panel to be installed. This alternate first distance is the distance that starts at the point of the valley (or more accurately the chalk line that is about 2.5 inches from the vertex of the valley) that is even with the bottom of the leading edge of the last installed panel and ends at the leading edge of said last installed panel, measured at a right angle (perpendicular) to said leading edge. The present device can be used to facilitate the measurement of this alternate first distance by placing the base 1 on the last rib at the leading edge last installed panel and sliding the base 1 down to the bottom of said rib and observing where the bottom of the pointer arm 2 intersects the valley's chalk line and measuring along the bottom of the pointer arm 2 (with a tape measure or similar tool) the distance from the center of the base 1 to the point where the pointer arm 2 intersects the chalk line. This alternate first distance will then be marked on the bottom edge of the panel that is to be installed. The panel will then be cut along the line that connects the point at the second distance along the leading edge of the panel to be installed to the point at the alternate first distance along the bottom edge of the panel to be installed.

Both sides of the device are the same, thus the base 1 can be placed on the last rib at the leading edge of the last installed panel whether the installation is progressing to the right or to the left. This makes it easy to use the device on both sides of the valley, whether it be a gable or otherwise.

The inventor's device, as constructed, is made of aluminum elements that are welded together. The base 1 is made out of two (2) right-angled pieces of aluminum stock that are welded at the apex of their angles, forming four (4) right angles. The base 1 is made out of aluminum angle stock with sides that are 1.5 inches wide and ⅛ inch thick. The pointer arm 2 is a single piece of long, thin, flat aluminum stock that comes to a point on its lower side (i.e., the side opposite the side where the support arm 3 is welded to it). The pointer arm 2 is welded at a right angle to one end of the base 1 at the apex of one of the right angles of said base 1, thus creating substantially 45 degree angles between each side of said pointer arm and its adjacent surface of the cross section of said base. The support arm 3 is a single piece of long, thin, flat aluminum stock welded to substantially the distal ends of the base 1 and the pointer arm 2. The strut 4 is a single piece of thin, flat aluminum stock which is welded to the support arm 3 and to the pointer arm 2 and which is shorter when compared to the base 1, the support arm 3, and the pointer arm 2. For the device that the inventor has manufactured, said aluminum stock for said pointer arm 2, support arm 3, and strut 4 is two (2) inches wide and ⅛ inch thick. One can also add spacers 5 to keep the pointer arm 2 parallel to the roof, so that it does not sit at an angle created by the slope from where said pointer arm 2 is attached to the base 1 to where it touches the roof with the distal end of the pointer arm 2. In the original embodiment of his invention, the inventor has manufactured two spacers 5, with one placed on the distal end of the pointer arm 2 (and coming to a point at the bottom where said pointer arm 2 comes to a point) and one to be placed along the length of the pointer arm 2. Said spacers 5 are made of aluminum stock and are 2 and ⅛ inches wide, thus, when notched in the middle, they fit over the pointer arm 2 and extend one (1) inch on each side. In this embodiment of the device, the spacers 5 extend one (1) inch on each side of the pointer arm 2 because the distance from the pointer arm 2 to the roof from where the pointer arm 2 connects to the base 1 also measures one (1) inch.

The preferred embodiment of the device replaces the solid, notched spacers 5 from the original embodiment with angled pieces of the same material comprising the pointer arm 2, the support arm 3, and the strut 4. In practice, for the spacer 5 along the pointer arm 2, the inventor has used two pieces of 2-inch wide by ⅛-inch thick aluminum stock, each bent at a right angle and welded to opposite sides of the pointer arm 2 along its length so that each spacer 5 lifts the pointer arm 2 one (1) inch above the roof, as this is the distance from the roof to the apex of each rib in standard metal roofing. In practice, the inventor has manufactured the spacer 5 at the distal (pointing) end of the pointer arm 2 by welding pieces of ⅛-inch thick aluminum stock together to create a spacer 5 that comes to a point at the bottom of the distal end of the pointer arm 2 and extends one (1) inch from each side of the pointer arm 2.

What is claimed is:

1. A device that measures where to cut a metal roofing panel to fit it along a valley in the roof structure comprising:
    (a) a base with a proximal end and a distal end, having a length in between said ends and having a width and a depth;
    (b) a pointer arm with a proximal end and a distal end, having a length in between said proximal and distal ends that is substantially equal to the width of the metal roofing panel and having a width and depth and two substantially flat sides that are separated by said depth, with the proximal end of said pointer arm being attached to the proximal end of said base at a right angle, such that when said base is placed, with its proximal end down, along the last rib at the leading edge of the last installed metal roofing panel at a point on said rib at which the distal end of said pointer arm touches a chalk line located a distance from the vertex of the valley, the distance from the top of said last rib of said last installed metal roofing panel to the proximal end of said base can be measured; and
    (c) a plurality of spacers attached to said sides of said pointer arm, said spacers equally increasing the thickness of said pointer arm on both sides of said pointer arm so as to hold the pointer arm parallel to a surface of the roof when said base is placed along the last rib at the leading edge of the last installed metal roofing panel.
2. The device of claim 1, wherein said spacers are solid.
3. The device of claim 1, wherein said pointer arm is substantially 36 inches long.
4. The device of claim 1 further comprising a support arm having two ends and a length in between said ends, with one end of said support arm being attached to said base at substantially the distal end of said base and the other end of said support arm being attached to said pointer arm at substantially the distal end of said pointer arm.
5. The device of claim 4 further comprising a strut having two ends and a length in between said ends, with one end of said strut being attached along the length of said pointer arm and the other end of said strut being attached along the length of said support arm.
6. The device of claim 1, wherein said spacers are hollow.
7. The device of claim 6, wherein said spacers are constructed of flat pieces of the same material as said pointer arm.
8. The device of claim 1, wherein the cross-section of said base is in the shape of an "X" with four substantially right angles, said base having a width that is equal to its depth.
9. The device of claim 8, wherein said pointer arm is attached to said base at the apex of one of said right angles, creating substantially 45-degree angles between each side of said pointer arm and its adjacent surface of the cross section of said base.

* * * * *